(12) United States Patent
Brown et al.

(10) Patent No.: US 7,104,395 B2
(45) Date of Patent: Sep. 12, 2006

(54) CONTROL AND POWER DISTRIBUTION SYSTEM FOR A CONVEYOR

(75) Inventors: Thomas M. Brown, Vestal, NY (US); Anthony J. Desanto, Montrose, PA (US); Gary J. Locke, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 292 days.

(21) Appl. No.: 10/288,178

(22) Filed: Nov. 5, 2002

(65) Prior Publication Data

US 2004/0084284 A1 May 6, 2004

(51) Int. Cl.
*B65G 13/06* (2006.01)

(52) U.S. Cl. .............................. 198/781.06; 198/781.01

(58) Field of Classification Search ........... 198/781.06, 198/781.1, 783, 781.01
See application file for complete search history.

(56) References Cited

U.S. PATENT DOCUMENTS

| | | | | |
|---|---|---|---|---|
| 5,285,887 A * | 2/1994 | Hall | .................. | 198/460.1 |
| 5,582,286 A | 12/1996 | Kalm et al. | | |
| 5,862,907 A * | 1/1999 | Taylor | .................. | 198/781.05 |
| 5,906,268 A | 5/1999 | Kalm | | |
| 6,021,888 A * | 2/2000 | Itoh et al. | ................... | 198/783 |
| 6,253,909 B1 | 7/2001 | Kalm et al. | | |
| 6,302,266 B1 * | 10/2001 | DeFrancisco et al. | .. | 198/781.06 |
| 6,315,104 B1 | 11/2001 | Ebert | | |
| 6,415,914 B1 * | 7/2002 | Itoh et al. | .............. | 198/781.06 |
| 6,460,683 B1 * | 10/2002 | Pfeiffer | ..................... | 198/460.1 |
| 6,522,944 B1 * | 2/2003 | Wielebski et al. | .......... | 700/224 |

OTHER PUBLICATIONS

U.S. Locke U.S. Appl. No. 09/834,067, filed Apr. 12, 2002 for Modular System and Method For Controlling a Material Handling System.

* cited by examiner

*Primary Examiner*—James R. Bidwell
(74) *Attorney, Agent, or Firm*—Tarolli, Sundheim, Covell & Tummino LLP

(57) ABSTRACT

A conveyor conveys objects. The conveyor includes a plurality of sections, a first control panel, and a second control panel. The plurality of sections define the structure of the conveyor. Each of the plurality of sections has components for controlling the mechanical operation of each section. The controller controls and powers the conveyor. The first control panel provides control and power to a first group of four of the plurality of sections. The first control panel provides power to the components of the first group. The second control panel provides control and power to a second group of four of the plurality of sections. The second control panel provides power to the components of the second group. The modular interconnectivity components interconnect the controller, the first control panel, the second control panel, the first group, and the second group. The controller provide control and power to the first control panel and the second control panel.

5 Claims, 2 Drawing Sheets

# CONTROL AND POWER DISTRIBUTION SYSTEM FOR A CONVEYOR

TECHNICAL FIELD

The present invention relates to a power roller conveyor and, more particularly, to a control and power distribution system for a power roller conveyor.

BACKGROUND OF THE INVENTION

A conventional power roller conveyor typically has pre-wired controls in side rails and includes a power supply in each section. Custom components and field wiring of power drops by electricians increase the total cost of construction and assembly. For modularity, each section of the conventional conveyor has power and control connectors that mate with the sections upstream and downstream of it. If a section unseats during installation or normal use, the conventional conveyor requires extensive debug time to trouble-shoot.

SUMMARY OF THE INVENTION

A conveyor in accordance with the present invention is controlled and powered efficiently, economically, and reliably. The conveyor combines the control and power components of up to sixteen 30-inch zones into one enclosure or panel. Each panel distributes I/O and 24 VAC power locally with source power (i.e., 480 VAC) and field bus communication distributed regionally. Thus, power is distributed with low line loss and lower gauge wiring by local power supplies, which may efficiently convert power to 24V for local I/O.

The conveyor in accordance with the present invention defines a system that is packaged to reduce total cost of ownership. With modular cables and one-size-for-all panels, less engineering for each site installation is required. Fewer components are necessary to procure and spare. Installation only requires the mating up of keyed connectors at the panels and I/O points, which may be performed quickly with the lowest level of skilled labor. Field integration testing may also be reduced since the cables and panel are tested at assembly, typically off site. Further, maintenance may be reduced with fewer non-standard, pre-fabricated replacement parts.

This combination of components and their unique packaging is a cost effective system for power roller conveyor applications. The system requires one power source and one field bus master at the source of a power-roller conveyor run (a programmable logic controller with an attached field bus module, a personal computer scanner card in a PCI slot, etc.). Field bus communication and power are distributed in cables along the length of the conveyor run are "daisy-chained" in the control panels which may be located at about 40 foot increments.

Each control panel includes quick disconnect bulkhead connectors, 16 input-16 output I/O modules, a field bus communications adapter, and a power supply in a safe enclosure. The panel protects personnel from potential hazards of contact with the supply side of the power source. Each panel may be field mounted based on pre-punched holes to a conveyor rail and corresponding mating flanges on each panel. The panel door may have a disconnect to isolate personnel from power when the panel door is open. The disconnect may be overridden for integration and maintenance operations. Fuses in each panel may protect downstream components.

The I/O module may have 16 inputs for 16 photo-eye sensors and 16 outputs for power roller motor driver cards. One photo-eye and one motor driver card control each 30-inch conveyor zone that is part of up to four standard 10 foot conveyor sections. The conveyor in accordance with the present invention is not limited to this configuration, however, and is flexible enough to accommodate all combinations (i.e., straddling mechanical sections with separate panels, etc.). Thus, as stated above, one panel controls up to 40 feet of conveyor.

Additionally, a panel may have a field bus communications adaptor attached to it for one of several open buses such as Device Net, Interbus, Profibus, or Ethernet. The field bus protocol typically communicates with a bus master card in the controller. The card preferably communicates via an Object Linking and Embedding for Process Control (OPC) compliant interface to a software application, such as Think & Do Studio by Entivity. The software application manages the flow of product across the conveyor utilizing logic driven by I/O information. Thus, the logic loaded into multiple PLC's in prior art systems may be centrally located in the controller. This reduces development, installation, and support effort while creating a single point of contact for management level information systems.

The system in accordance with the present invention reduces the number of power drops, individual power supply points, and communication nodes (i.e., distributed Input/Output modules). Rather than a field bus node in every zone or one per conveyor section, up to sixteen zones are combined into a single control panel through cables. Field wiring is replaced by quick disconnect cables. Pre-wired and pre-tested control panels eliminate field wiring. The wiring is less expensive because it is standardized and made in bulk. A larger single power supply driving DC loads in both directions reduces the number of individual power supplies per section of conveyor. The system further allows significant reduction of the total number of connectors and terminations per installation.

BRIEF DESCRIPTION OF THE DRAWINGS

The foregoing and other advantages of the invention will become more readily apparent from the following description of an example embodiment of the invention as taken in conjunction with the accompanying drawings, which are a part hereof, and wherein.

DESCRIPTION OF AN EXAMPLE EMBODIMENT

Figure 1:
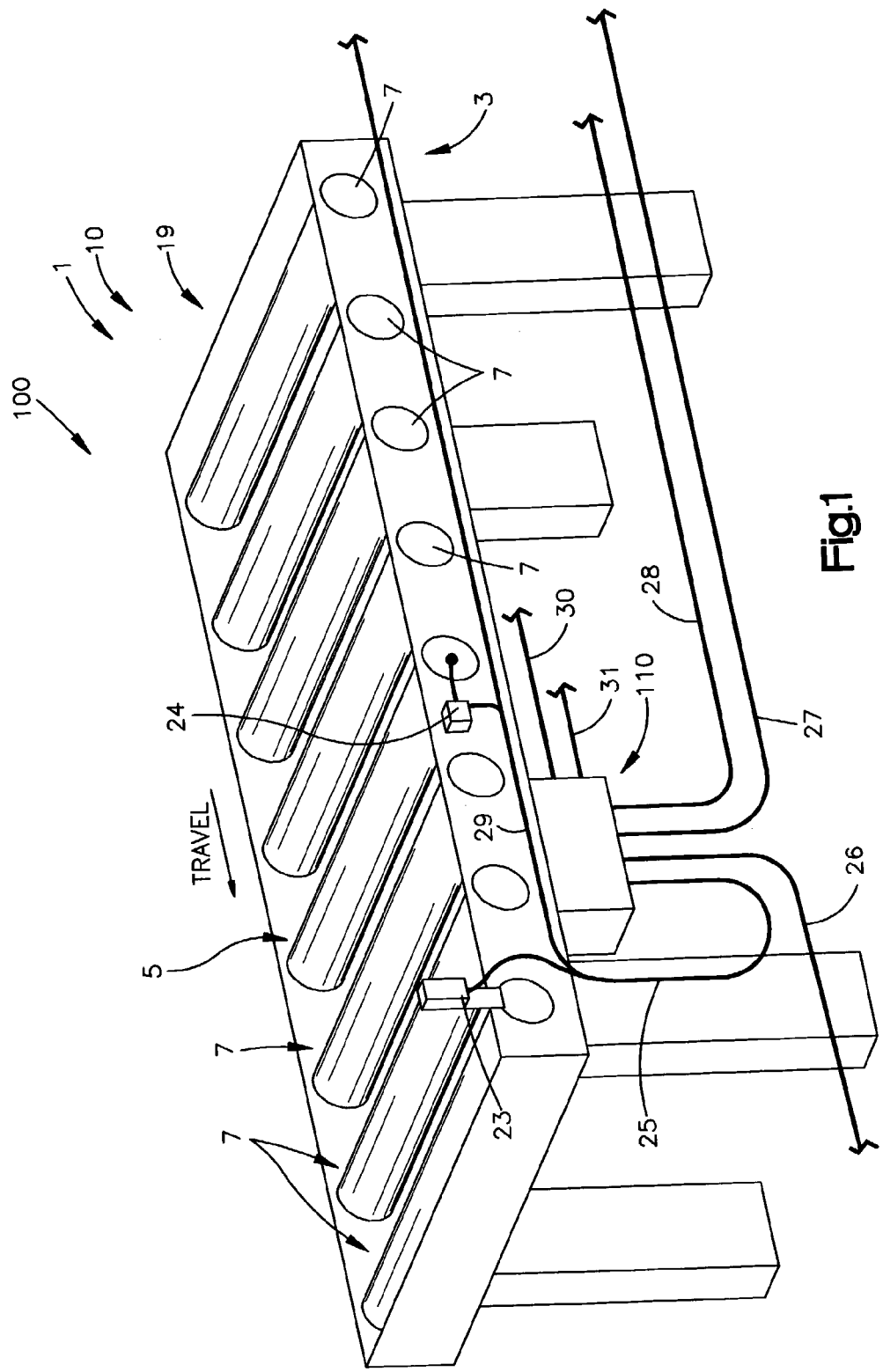
FIG. 1 is a schematic representation of an example part of a conveyor system for use with the a system in accordance with the present invention.

A system 100 (as illustrated schematically in FIGS. 1 and 2) in accordance with the present invention controls and powers a conveyor 1. An example accumulation conveyor 1 for use with the system 100 may use electrical sensors, motor driver cards, and a power roller. Each section 10 of the example conveyor 1 is linked to three adjacent sections 10 (not shown). A network of control/power panels 110, each controlling and powering groups of four sections 10, and a controller 120 interact to control and power the entire conveyor 1.

Figure 2:
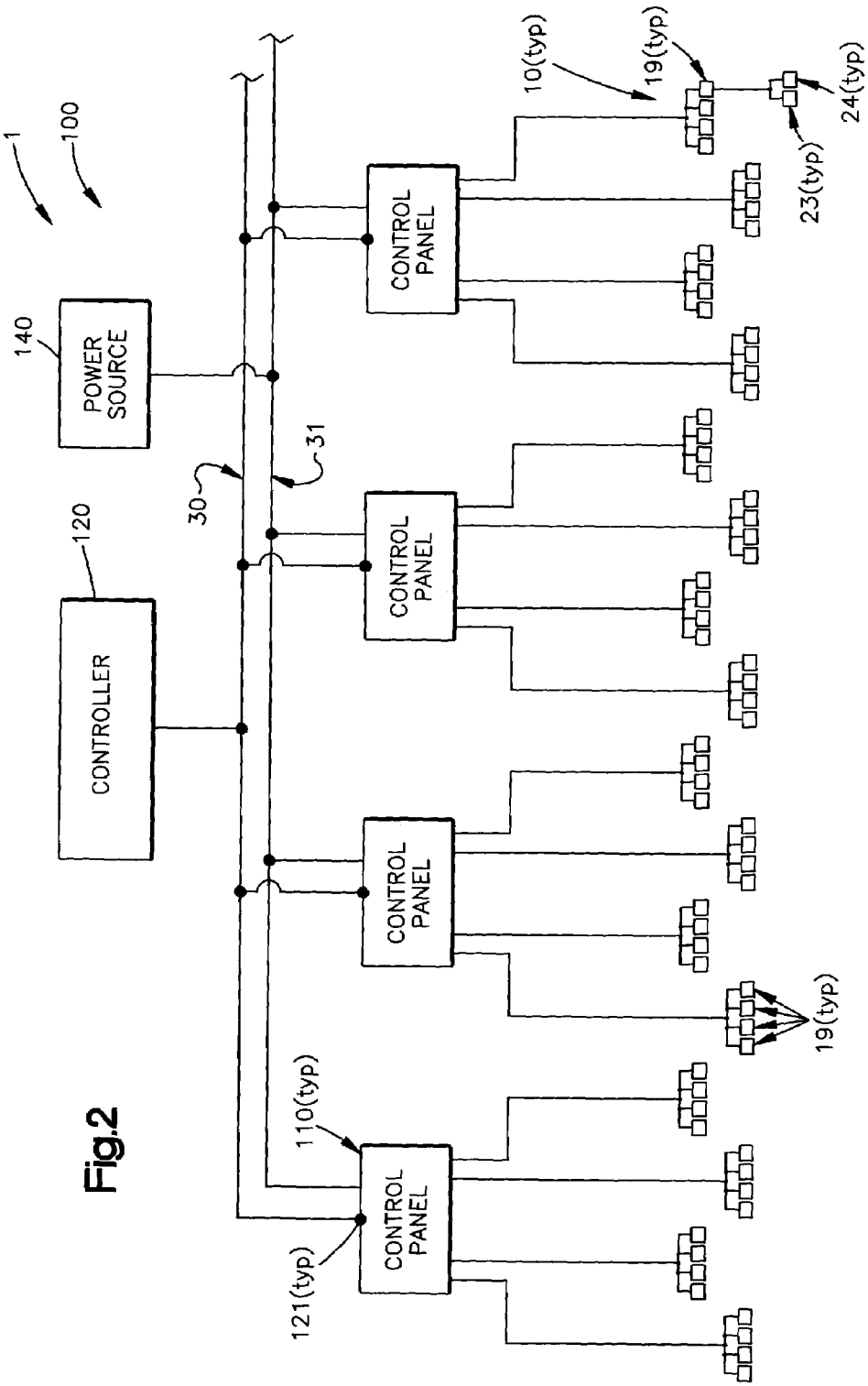
FIG. 2 is a schematic representation of an example part of a system in accordance with the present invention.

As illustrated schematically in FIGS. 1 and 2, a 30" zone 19 of a section 10 of the conveyor 1 may include a photo-eye sensor 23 and a motor driver card 24 powered by a 24 VDC power supply panel 110. Therefore, four zones 19 may correspond to four inputs (i.e., photo-eye sensors 23) and four outputs (i.e., motor driver cards 24) in the panel 110, plus 24 VDC power distribution from a power supply.

The control and power distribution system 100 in accordance with the present invention provides a minimized setup time, quiet operation (no mechanical sensors and the conveyor of the system only runs when necessary), reduced costs (no PLC and complicated wiring, no air or electrical piping required), easy to maintain architecture (all control modules may be identical and made from standard industrial products, quick disconnects allow for fast replacement of components). The power supplies may be sized for ampere draw of the motor driver cards. The power rollers may be sized for motor torque and weight.

Each panel 110 mounts to part of a group of four sections 10, or sixteen zones 19, of the example conveyor 1. Each of the four sections 10 is linked to the panel 110 using a single, 10 conductor, quick-disconnect cable 25, 26, 27, 28. No additional devices (i.e., multiple PLCs) are needed to control a basic conveyor such as the example conveyor 1. Power is supplied to the panels 110 through cables 31 from the power supply 140. Wire hookup is simple. After mechanically connecting each zone 19 to the next zone 19, and each section 10 to the next section 10, control and power cables may be laid in the conveyor rails.

The panel 110 may be made from standard industrial products. Cables are pre-wired to connect to the four corresponding sections 10 with quick-disconnect cables installed for the photo-eyes 23 and the motor driver cards 24.

The example zone 19 may further include a frame 3 and a driving roller 5 typically in the middle of between six and fifteen following rollers 7. The driving roller 5 contains a motor. The driving roller 5 may also be mechanically linked (i.e., banded, belted, O-rings, etc.) to each of the following rollers 7 so that all rollers 5, 7 rotate when the motor is operating.

Up to sixteen zones 19 may have a single associated control/power panel 110 (i.e., four zones 19 per ten-foot section 10). The panel 110 includes a suitably sized housing enclosing components therein. A photo-eye sensor 23 may be provided which may be linked to the panel 110 via the modular cable harness 25. The panel 110 also includes a connecting cable 30 that communicates via a quick-connect coupling (not shown) for networking to a central controller such as personal computer 120.

A typical field bus may coordinate up to sixty-four nodes 121 (one at the controller 120 and at each panel 110) controlled by the same field bus master card in a controller, typically a personal computer 120 (FIG. 2). One master card may thereby control 1024 zones (i.e., zone 19). Further, a personal computer with sufficient capability may drive up to seven master cards simultaneously (i.e., 7×1024 zones of conveyor).

Thus, the control and power distribution system 100 comprises modular components that may be combined to "tier up" into a complete control and power distribution system architecture for the example conveyor 1. The example system 100 may thereby control up to 17,920 feet of the example conveyor (i.e., 7×1024 zones×2.5 feet per zone). A plurality of controllers (i.e., personal computer 120) may be combined to greater lengths of conveyor.

Although the invention has been described in conjunction with the example embodiment, it is to be appreciated that various modifications may be made without departing from the spirit and scope of the invention as defined by the appended claims.

Having described the invention, we claim:

1. A conveyor for conveying objects, said conveyor comprising:
 a plurality of sections defining the structure of said conveyor, each of said plurality of sections having components for controlling the mechanical operation of each said section, each of said plurality of sections comprising four zones;
 a controller for controlling and powering the conveyor;
 a first control panel for providing control and power to a first group of four of said plurality of sections, said first control panel providing power to said zones of said first group;
 a second control panel for providing control and power to a second group of four of said plurality of sections, said second control panel providing power to said zones of said second group; and
 modular interconnectivity components for interconnecting said controller, said first control panel, said second control panel, said first group, and said second group,
 said controller providing control and power to said first control panel and said second control panel.

2. The conveyor as set forth in claim 1 further comprising:
 a third control panel for providing control and power to a third group of four of said plurality of sections, said third control panel providing power to said zones of said third group,
 said controller providing control and power to said third control panel.

3. The conveyor as set forth in claim 2 further comprising:
 a fourth control panel for providing control and power to a fourth group of four of said plurality of sections, said fourth control panel providing power to said zones of said fourth group,
 said controller providing control and power to said fourth control panel.

4. The conveyor as set forth in claim 1 wherein said zones include a motor for driving a roller of one of said zones.

5. The conveyor as set forth in claim 1 wherein said zones include a photo eye for sensing objects on one of said plurality of zones.

* * * * *